United States Patent [19]

Haaf et al.

[11] 4,172,826

[45] Oct. 30, 1979

[54] POLYPHENYLENE ETHER RESIN COMPOSITIONS CONTAINING EPDM RUBBER-MODIFIED ALKENYL AROMATIC RESINS AND HYDROGENATED ELASTOMERIC BLOCK COPOLYMERS

[75] Inventors: William R. Haaf, Voorheesville; Glenn D. Cooper, Delmar, both of N.Y.

[73] Assignee: General Electric Company, Pittsfield, Mass.

[21] Appl. No.: 855,250

[22] Filed: Nov. 28, 1977

[51] Int. Cl.$^2$ .................. C08K 7/14; C09L 51/00; C08L 53/00
[52] U.S. Cl. ..................... 260/42.18; 260/45.7 R; 260/45.7 P; 260/45.75 B; 260/45.9 NP; 525/96; 525/98; 525/99
[58] Field of Search ....... 260/876 R, 876 B, 45.9 NP, 260/42.18, 45.7 R, 45.7 P, 45.75 B

[56] References Cited

U.S. PATENT DOCUMENTS

| | | | |
|---|---|---|---|
| 3,299,174 | 1/1967 | Kuhre et al. | 260/876 B |
| 3,333,024 | 7/1967 | Haefele et al. | 260/880 |
| 3,658,945 | 4/1972 | Nakashio et al. | 260/876 R |
| 3,943,191 | 3/1976 | Cooper et al. | 260/876 R |
| 3,960,808 | 6/1976 | Katchman | 260/876 B |
| 3,981,841 | 9/1976 | Abolins et al. | 260/876 R |

*Primary Examiner*—J. Ziegler
*Attorney, Agent, or Firm*—Morgan, Finnegan, Pine, Foley & Lee

[57] ABSTRACT

Novel compositions are disclosed which include a polyphenylene ether resin, a small-particle EPDM rubber-modified alkenyl aromatic resin, and a hydrogenated A-B-A block copolymer. Also included within the scope of this invention are reinforced and flame-retardant compositions of said polyphenylene ether resin, said alkenyl aromatic resin modified with an EPDM rubber, and said hydrogenated elastomeric block copolymer.

31 Claims, No Drawings

POLYPHENYLENE ETHER RESIN COMPOSITIONS CONTAINING EPDM RUBBER-MODIFIED ALKENYL AROMATIC RESINS AND HYDROGENATED ELASTOMERIC BLOCK COPOLYMERS

This invention relates to improved compositions of a polyphenylene ether resin, an alkenyl aromatic resin modified with an EPDM rubber, and a hydrogenated elastomeric block copolymer. Reinforced and flame-retardant compositions are also provided.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al, U.S. Pat. No. 3,337,499; Blanchard et al, U.S. Pat. No. 3,219,626; Laakso et al, U.S. Pat. No. 3,342,892; Borman, U.S. Pat. No. 3,344,116; Hori et al, U.S. Pat. No. 3,384,619; Faurote et al, U.S. Pat. No. 3,440,217; and Cooper et al., U.S. Pat. No. 3,661,848, U.S. Pat. No. 3,733,299, U.S. Pat. No. 3,838,102, and U.S. Pat. No. 3,988,297. Disclosures relating to metal based catalysts which do not include amines, are known from patents such as Wieden et al., U.S. Pat. No. 3,442,885 (copper-amidines); Nakashio et al., U.S. Pat. No. 3,573,257 (metal-alcoholate or -phenolate); Kobayashi et al., U.S. Pat. No. 3,445,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al., U.S. Pat. No. 3,382,212. Cizek, U.S. Pat. No. 3,838,435 discloses polyphenylene ether-styrene resin compositions. All of the above-mentioned disclosures are incorporated herein by reference.

In the prior art, rubber-modified styrene resins have been admixed with polyphenylene ether resins to form compositions that have modified properties. The Cizek patent, U.S. Pat. No. 3,383,435 discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers is improved.

Nakashio et al, U.S. Pat. No. 3,658,945 discloses that from 0.5 to 15% by weight of an EPDM-modified styrene resin may be used to upgrade the impact strength of polyphenylene ether resins. In Cooper et al, U.S. Pat. No. 3,943,191 it is disclosed that when the highly unsaturated rubber used in compositions of the type disclosed by Cizek, is replaced with EPDM rubber that has a low degree of residual unsaturation, the thermal oxidative stability and color stability are improved. The EPDM rubber in the Cooper et al compositions is comprised substantially of particles in the range of 3–8 microns. The disclosures of the Nakashio et al and Cooper et al patents are incorporated herein by reference.

The impact strength of the Cooper et al compositions is superior to that of a polyphenylene ether resin alone or that of similar compositions comprised of unmodified polystyrene; however, the impact strength of the Cooper et al compositions is inferior to that of similar compositions comprised of polystyrene modified with polybutadiene rubber, such as a composition known as FG-834, available from Foster-Grant Co.

As is disclosed in Abolins et al, U.S. Pat. No. 3,981,841, the impact strength of the Cooper et al. composition can be improved by incorporating therein impact modifiers such as an emulsion-grafted EPDM polystyrene copolymer. Copending, commonly assigned U.S. patent application Ser. No. 787,253, filed Apr. 13, 1977, incorporated herein by reference, discloses that a composition of a polyphenylene ether resin and an alkenyl aromatic resin modified with an EPDM rubber comprised of particles having a median diameter less than about two microns has good thermal oxidative stability and good impact strength. In copening, commonly assigned U.S. patent application Ser. No. 838,373 filed Sept. 30, 1977, it is disclosed that polyphenylene ether resin compositions containing EPDM-modified polystyrene and hydrogenated triblock copolymers have good properties.

It has now been found that a composition of a polyphenylene ether resin, an alkenyl aromatic resin modified with a small-particle EPDM rubber, and a hydrogenated elastomer block copolymer is a very useful thermoplastic molding material having good thermal oxidative stability and surprisingly high impact resistance.

It is, therefore, a primary object of this invention to provide improved compositions that are based on polyphenylene ether resins, modified alkenyl aromatic resins, and hydrogenated elastomeric block copolymers.

Another object of this invention is to provide molding compositions and molded articles that are based on a polyphenylene ether resin and a small-particle EPDM-modified alkenyl aromatic resin and that have improved thermal oxidative stability.

Still another object of this invention is to provide molding compositions and molded articles that are based on a polyphenylene ether resin, a small-particle EPDM-modified alkenyl aromatic resin, a hydrogenated elastomeric block copolymer and that have improved impact strength.

It is also an object of this invention to provide the above-described, improved molding compositions in reinforced and/or flame-retardant embodiments.

DESCRIPTION OF THE INVENTION

The above-mentioned advantages and objects are others will be readily apparent to those skilled in the art by the following compositions.

Preferred types will include thermoplastic compositions which comprise:
  (a) from about 20 to about 80% by weight of a polyphenylene ether resin;

(b) from about 20 to about 80% by weight of an alkenyl aromatic resin that is modified with a small-particle EPDM rubber, that is, a rubbery interpolymer comprised of particles having a median diameter less than about two microns and comprising a mixture of monoolefins and a polyene; and (c) from about 1 to about 20% by weight of a hydrogenated elastomeric block copolymer of the A-B-A type, wherein A is a polymerized vinyl aromatic hydrocarbon and the center block B is a polymerized conjugated diene.

The preferred polyphenylene ethers are of the formula

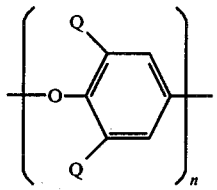

I wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

Examples of polyphenylene ethers corresponding to the above formula can be found in the above-referenced patents of Hay and Stamatoff. Especially preferred is poly(2,6-dimethyl-1,4-phenylene) ether.

The alkenyl aromatic resin should have at least 25% of its units derived from an alkenyl aromatic monomer of the formula

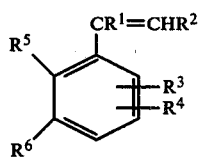

II wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group.

Specific examples of alkenyl aromatic monomers include styrene, bromostyrene, chlorostyrene, α-methylstyrene, vinyl-xylene, divinylbenzene, vinyl naphthalene, and vinyl-toluene.

The alkenyl aromatic monomer may be copolymerized with materials such as those having the general formula

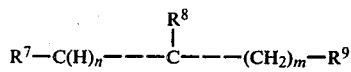

III wherein the dotted lines each represent a single or a double carbon to carbon bond; $R^7$ and $R^8$ taken together represent a

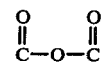

linkage; $R^9$ is selected from the group consisting of hydrogen, vinyl, alkyl of from 1 to 12 carbon atoms, alkenyl of from 1 to 12 carbon atoms, alkylcarboxylic acid of from 1 to 12 carbon atoms, and alkenylcarboxylic acid of from 1 to 12 carbon atoms; n is 1 or 2, depending on the position of the carbon-carbon double bond; and m is an integer of from 0 to about 10. Examples include maleic anhydride, citraconic anhydride, itaconic anhydride, aconitic anhydride, and the like.

The alkenyl aromatic resins include, by way of example, homopolymers such as homopolystyrene and monochloropolystyrene, and styrene-containing copolymers, such as styrene-chlorostyrene copolymers, styrene-bromostyrene copolymers, the styrene acrylonitrile-α-alkyl styrene copolymers, styrene-acrylonitrile copolymers, styrene butadiene copolymers, styrene-acrylonitrile butadiene copolymers, poly-α-methylstyrene, copolymers of ethylvinylbenzene, divinylbenzene, and styrene maleic anhydride copolymers, and block copolymers of styrene butadiene and styrene-butadiene styrene.

The styrene-maleic anhydride copolymers are described in U.S. Pat. No. 2,971,939, U.S. Pat. No. 3,336,267, and U.S. Pat. No. 2,769,804, all of which are incorporated herein by reference.

The useful EPDM rubbers include those prepared from ethylene, an alpha-olefin, and a polyene. Preferred types comprise 10-90 mole percent of ethylene, 10-90 mole percent of an alpha-olefin containing 3-16 carbon atoms, and 0.1-12 mole percent of a polyene that is a non-conjugated cyclic or open-chain diene having 5-20 carbon atoms. Especially preferred are those alpha-olefins having 3-10 carbon atoms and non-conjugated cyclic or open-chain dienes having 5-10 carbon atoms.

Useful EPDM rubbers also include the ethylene-propyleneethylidene norbornene terpolymer and those described in Ritchie, Vinyl and Allied Polymer, Vol. 1, Page 121 (1968), which is incorporated herein by reference. Preferred EPDM rubbery interpolymers are those comprised of ethylene, propylene, and 5-ethylidene-2-norbornene; of ethylene, propylene, and 1,4-hexadiene; and of ethylene, propylene, and dicyclopentadiene. Preferred modified alkenyl aromatic resins will include from about 4 to about 25% by weight of rubbery interpolymer.

The alkenyl aromatic resin modified with a small-particle EPDM rubber may be prepared by dissolving the rubbery interpolymer in the alkenyl aromatic monomer and polymerizing the mixture, preferably in the presence of a free-radical initiator, until 90-100% by weight of the alkenyl aromatic monomer has reacted to form said small-particle EPDM-modified alkenyl aromatic resin.

In the hydrogenated elastomeric block copolymers of the A-B-A type, the terminal blocks A represent polymerized monomers of Formula II above. Center block B represents a polymerized conjugated diene of at least four carbon atoms, preferably selected from the group consisting of 1,3-butadiene, 2-methyl-1,3-butadiene, 2,3-dimethyl-1,3-butadiene, and 1,3-pentadiene. The preferred A-B-A block copolymers are the styrene-butadiene-styrene block copolymers having 30 to 100 parts by weight of styrene to 100 parts by weight of butadiene.

The ratios of the polymerized monomers can vary broadly, so long as the molecular weight of the center block is greater than the combined molecular weights of terminal blocks. Preferably, within this limitation, the molecular weight of each terminal block will range from about 4,000 to about 115,000 and that of the hydrogenated center block will range from about 20,000 to about 450,000.

Unhydrogenated block copolymers can be prepared by an organometallic initiation process using, for example, sodium of lithium metal or an organic derivative thereof. The diene monomers can be polymerized with a monofunctional or difunctional initiator, as is described in detail in "Polymer Chemistry of Synthetic Elastomers", edited by Kennedy et al., Interscience Publishers, Vo. 23, Part II (1969), pages 553–559, incorporated herein by reference.

Other methods of preparation are described in Zelinski, U.S. Pat. No. 3,251,905 and Holden et al., U.S. Pat. No. 3,231,635, the disclosures of which are incorporated herein by reference.

Hydrogenation may be conducted using a variety of hydrogenation catalysts, e.g., nickel, Raney nickel, copper chromate, molybdenum sulfide, finely divided paltinum, etc., on a carrier. The hydrogenation can be carried out at any desired temperature or pressure, from atmospheric to about 3,000 p.s.i.g., the usual range being between 100 and 1,000 p.s.i.g., at temperatures of from about 75° to 600° F., for a period of time ranging from about 0.1 to 24 hours, preferably about 0.2 to 8 hours. The preparation of hydrogenated block copolymers is described in detail in Jones, U.S. Pat. No. 3,431,323, the disclosure of which is incorporated herein by reference.

Preferably the average unsaturation of center block B in the A-B-A type block copolymers is reduced to less than about 20% of its original value.

The compositions of the invention can also include other ingredients, such as flame retardants, extenders, processing aids, pigments, stabilizers, fillers such as mineral fillers and glass flakes and fibers, and the like. In particular, reinforcing fillers, in amounts sufficient to impart reinforcement, can be used, e.g., aluminum, iron or nickel, and the like, and non-metals, e.g., carbon filaments, silicates, such as acicular calcium silicate, asbestos, titanium dioxide, potassium titanate and titanate whiskers, glass flakes and fibers, and the like. It is to be understood that, unless the filler adds to the strength and stiffness of the composition, it is only a filler and not a reinforcing filler as contemplated herein. In particular, the reinforcing fillers increase the flexural strength, the flexural modulus, and the tensile strength.

Although it is only necessary to have at least a reinforcing amount of the reinforcement present, in general, the combination of components (a), (b), and (c) will comprise from about 10 to about 90 parts by weight and the filler will comprise from about 10 to about 90 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, by flame blowing, or by mechanical pulling. The preferred filaments for plastics reinforcement are made by mechanical pulling. The filament diameters range from about 0.000112 to 0.00075 inch, but this is not critical to the present invention.

In general, the best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present. However, it is useful also to prepare the compositions containing substantially greater quantities, e.g., up to 70–80% by weight of glass. These concentrates can then be custom blended with resin compositions that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about $\frac{1}{8}$" to about 1" long, preferably less than $\frac{1}{4}$" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.005 and 0.125 inch.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame-retardant. Sizings, if present, can readily be removed by heat cleaning or other techniques well known to those skilled in the art.

It is also a feature of this invention to provide flame-retardant thermoplastic compositions, as defined above, by modifying the composition to include a flame-retardant additive in a minor proportion but in an amount at least sufficient to render the composition self-extinguishing. Such flame-retardant compositions include a halogenated organic compound, a halogenated organic compound in admixture with an antimony compound, elemental phosphorus, a phosphorus compound, compounds containing phosphorus-nitrogen bond, or a mixture of two or more of the foregoing.

When used herein, the terms "self-extinguishing", and "non-dripping" are used to describe compositions which meet the standards of Underwriters' Laboratories Bulletin No. 94. Another recognized procedure to determine flame resistance of resinous compositions is the Oxygen Index Test or LOI (Limiting Oxygen Index). This test is a measure of a product's combustibility based on the oxygen content of the combustion atmosphere. Appropriate specimens are placed in a combustion chimney, and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test method D-2863. The compositions of this invention which contain flame-retardant additives in the specified amounts have a substantially higher oxygen index than the controls.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus, and nitrogen. It is preferred that the flame-retardant additive comprise a halogenated organic compound (brominated or chlorinated); a halogen-containing organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds; or a mixture of two or more of the foregoing.

The amount of flame-retardant additive used is not critical to the invention, so long as it is present in a minor proportion based on the polyphenylene ether-modified alkenyl aromatic polymer composition—major proportions will detract from physical properties—but at least sufficient to render the composition self-extinguishing. Those skilled in the art are well aware that the amount will vary with the nature of the polymers in the composition and with the efficiency of the additive. In general, however, the amount of additive will be from about 0.5 to 50 parts by weight per hundred parts of components (a), (b), and (c). A preferred range will be from about 1 to 25 parts, and an especially preferred range will be from about 3 to 15 parts of additive per hundred parts of (a), (b), and (c). Smaller amounts of compounds highly concentrated in the elements responsible for flame retardance will be sufficient, e.g., elemental red phosphorus will be preferred at about 0.5 to 10 parts by weight per hundred parts of (a), (b), and (c), while phosphorus in the form of triphenylphosphate will be used at about 3 to 25 parts of phosphate per hundred parts of (a), (b), and (c), and so forth. Halogenated aromatics will be used at about 2 to 20 parts and synergists, e.g., antimony oxide, will be used at about 1 to 10 parts by weight per hundred parts of components (a), (b), and (c).

Among the useful halogen-containing compounds are those of the formula

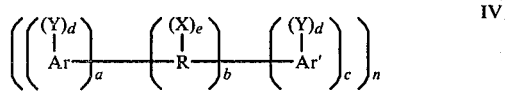

IV wherein n is 1 to 10 and R is an alkylene, alkylidene, or cycloaliphatic linkage, e.g., methylene, ethylene, propylene, isopropylene, isopropylidene, butylene, isobutylene, amylene, cyclohexylene, cyclopentylidene, and the like; or a linkage selected from the group consisting of ether; carbonyl; amine; a sulfur-containing linkage, e.g., sulfide, sulfoxide, or sulfone; carbonate; a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can be dihydric phenol, e.g., bisphenol-A, carbonate linkage. Other groups which are represented by R will occur to those skilled in the art. Compounds of this type are disclosed in U.S. Pat. No. 3,647,747 and U.S. Pat. No. 3,334,154, both of which are incorporated herein by reference.

Ar and Ar' are mono- or polycarbocyclic aromatic groups such as phenyl, biphenyl, terphenyl, naphthyl, and the like. Ar and Ar' may be the same or different.

X is a monovalent hydrocarbon group exemplified by the following: alkyl groups, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used, they may be alike or different.

Y is a substituent selected from the group consisting of organic, inorganic, and organometallic radicals. The substituents represented by Y include (1) halogen, e.g., chlorine, bromine, iodine, or fluorine, (2) ether groups of the general formula OE, wherein E is a monovalent hydrocarbon radical similar to X, (3) monovalent hydrocarbon groups of the type represented by R, and (4) other substituents, e.g., nitro, cyano, etc., said substituents being essentially inert provided there be at least one and preferably two halogen atoms per aryl, e.g., phenyl, nucleus.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When be is not 0, neither a nor c may be 0, and when b is 0, either a or c, but not both, may be 0. Where b is 0, the aromatic groups are joined by a direct carbon-carbon bond.

The hydroxyl and Y substituents on the aromatic groups, Ar and Ar', can be varied in the ortho, meta, or para positions on the aromatic rings, and the groups can be in any possible geometric relationship with respect to one another.

Included within the scope of the above formula are di-aromatics of which the following are representative:
2,2-bis-(3,5-dichlorophenyl)propane
bis-(2-chlorophenyl)methane
bis-(2,6-dibromophenyl)methane
1,1-bis-(4,iodophenyl)ethane
1,2-bis-(2,6-dichlorophenyl)ethane
1,1-bis-(2-chloro-4-iodophenyl)ethane
1,1-bis-(2,chloro-4-methylphenyl)ethane
1,1-bis-(3,5-dichlorophenyl)ethane
2,2-bis-(3-phenyl-4-bromophenyl)ethane
2,3-bis-(4,6-dichloronaphthyl)propane
2,2-bis-(2,6-dichlorophenyl)pentane
2,2-bis-(3,5-dichromophenyl)hexane
bis-(4-chlorophenyl)phenylmethane
bis-(3,5-dichlorophenyl)cyclohexylmethane
bis-(3-nitro-4-bromophenyl)methane bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane The preparation of these and other applicable biphenyls are known in the art. In the above examples sulfide, sulfoxy, and the like may be substituted in place of the divalent aliphatic group.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl, and halogenated diphenul ethers containing from 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene group and having at least two chlorine or bromine atoms per phenyl nucleus, or mixtures of at least two of the foregoing.

Especially preferred are hexabromobenzene and chlorinated biphenyls or terphenyls, alone, or mixed with antimony oxide.

In general, the preferred phosphorus compounds are selected from the group of elemental phosphorus and organic phosphonic acids, phosphonates, phosphine oxides, phosphines, phosphites, and phosphates. Illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula:

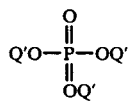

and nitrogen analogs thereof where each Q' represents the same or different radicals including hydrocarbon radicals such as alkyl, cycloalkyl, aryl, alkyl substituted aryl, and aryl substituted alkyl; halogen; hydrogen; and combinations thereof provided that at least one said Q' is aryl. Typical examples of suitable phosphates include phenylbisdodecyl phosphate, phenylbisneopentyl phosphate, phenylethylene hydrogen phosphate, phenylbis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolyphosphate, tritolyl phosphate, bis-(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyl-diphenyl phosphate, p-tolyl bis(2,5,5'-trimethylhexyl) phosphate, 2-ethylhexyldiphenyl phosphate, diphenyl hydrogen phosphate, and the like. The preferred phosphates are those where each Q' is aryl. The most preferred phosphate is triphenyl phosphate. It is also preferred to use triphenyl phosphate in combination with hexabromobenzene and, optionally, antimony oxide. Especially preferred is a composition comprised of mixed triaryl phosphates, with one or more isopropyl groups on some or all of the aryl rings, such as Kronitex 50 supplied by Food Machinery Corporation.

Also suitable as flame-retardant additives for this invention are compounds containing phosphorus-nitrogen bonds, such as phosphonitrilic chloride, phosphorus ester amides, phosphoric acid amides, or phosphonic acid amides. These flame-retardant additives are commercially available.

The compositions of the invention may be formed by conventional techniques, that is, by first dry mixing the components to form a premix, and then passing the premix through an extruder at an elevated temperature, e.g., 425° to 640° F.

By way of illustration, glass roving (a bundle of strands of filaments) is chopped into small pieces, e.g., ⅛" to 1" in length, and preferably less than ¼" in length and put into an extrusion compounder with (a) the polyphenylene ether resin, (b) the alkenyl aromatic resin that is modified with a rubbery interpolymer of a mixture of mono-olefins and a polyene, (c) the hydrogenated elastomeric block copolymer, and (d) the flame-retardant additive(s), to produce molding pellets. The fibers are shortened and predispersed in the process, coming out at less than 1/16" long. In another procedure, glass filaments are ground or milled to short lengths, are mixed with the polyphenylene ether resin, the modified alkenyl aromatic polymer and, optionally, flame-retardant additive, by dry blending, and then are either fluxed on a mill and ground, or are extruded and chopped.

In addition, compounding should be carried out to insure that the residence time in the machine is short; that the temperature is carefully controlled; that the frictional heat is utilized; and that an intimate mixture between the resins and the additives is obtained.

DESCRIPTION OF THE PREFERRED EMBODIMENTS

The following examples are set forth as further illustration of the invention and are not to be construed as limiting the invention thereto.

EXAMPLE I

One-hundred grams of Epcar 387, a terpolymer of ethylene, propylene and ethylidene-norbornene, available from Goodrich Chemical Co., was dissolved under nitrogen in 900 g of styrene. 1.2 g of tert-butyl peracetate was added, and the solution was transferred to a one gallon stainless steel reactor, stirred at 1600 rpm by a 3½"×½" six-blade turbine. The solution was heated to 100° C., and after three hours at this temperature, the reactor mixture was suspended in 1500 ml of water containing 4 g of poly(vinyl alcohol) and 3 g of gelatin. The stirring speed was reduced to 800 rpm, and the suspension was heated for one hour at 100° C., then for two hours at 120° C., for one hour at 140° C., and finally for two and one-half hours at 155° C. The suspension was allowed to cool, and the beads of EPDM-modified polystyrene were filtered off, washed with hot water, and dried. The average rubber particle diameter in the product was 1.0 microns.

The EPDM-modified polystyrene produced by the above procedure is denoted as Experimental Copolymer A (EC-A).

Another EPDM-polystyrene, designated Experimental Copolymer B (EC-B), was prepared in the same way but in a different reactor equipped with propellor-type stirrer operated at low speed. It had a median rubber particle diameter of approximately 4 microns.

A test specimen comprised of poly(2,6-dimethyl-1,4-phenylene)ether resin (PPO) and the above prepared EPDM-modified polystyrene, known as EC-A, was prepared via 28 mm twin-screw co-extrusion of the components at 575° F. followed by injection molding at 530° F., using a 3 oz. screw-injection press. Additional test specimens comprised of the EPDM-modified polystyrene compositions were similarly prepared. The respective compositions and physical test data are set forth in the following table.

TABLE 1

| Ex. | Composition (parts by weight)[a] | | | | Properties | | | | | |
|-----|-----|-----|-----|-----|-----|-----|-----|-----|-----|-----|
| | PPO | Taf 925[b] | EC-B | EC-A | KG 1652[c] | HDT[d] | Izod[e] | % E[f] | Yield[g] | Break[h] |
| C-1* | 50 | — | — | 50 | — | 250 | 4.5 | 56 | 9,900 | 8,200 |
| C-2* | 50 | 40 | — | — | 10 | 241 | 5.2 | 24 | No discrete yield point | 6,900 |
| C-3* | 50 | — | 40 | — | 10 | 243 | 6.1 | 41 | 7,800 | 7,400 |
| I | 50 | — | — | 40 | 10 | 251 | 11.8 | 39 | 7,100 | 6,800 |

*control
[a] Also containing 1.5 parts polyethylene, 3 parts triphenylphosphate, 1.0 parts tridecylphosphite, 0.15 parts zinc sulfide, 0.15 parts zinc oxide, and 3 parts titanium dioxide
[b] Taflite 925-01, an EPDM-modified polystyrene having a median rubber-particle size of 5.1 microns, available from Mitsui-Toatsu.
[c] Kraton G 1652, a hyrdrogenated styrene-butadiene-styrene block copolymer supplied by Shell Chemical Co.
[d] Heat distortion temperature at 264 psi (°F.)
[e] Izod impact strength (ft. lbs/in. notch)
[f] Tensile elongation (%)
[g] Tensile yield strength (psi)
[h] Tensile strength at break (psi) for a ⅛" × 2 ½" L-type specimen

EXAMPLE II

EPDM-modified polystyrene was prepared as described in the previous examples, with the exception that 2.5 ml of tert-dodecyl mercaptan was added to the mixture just prior to suspension. The product, denoted as Experimental Copolymer C (EC-C), had an average rubber particle diameter of 1.0 microns.

Three-hundred grams of PPO, 300 g of the EPDM-modified polystyrene, 6 g of tridecyl phosphite, 18 g of triphenyl phosphate, 9 g of polyethylene, 0.9 g of zinc sulfide, and 0.9 g of zinc oxide were mixed together and extruded at 575° in a 28 mm twin screw extruder. The extruded pellets were molded at 500° into standard test pieces on a 3 oz. screw injection molding machine.

Another composition was extruded and molded from 300 g of PPO, 240 g of the EPDM-modified polystyrene, 60 g of Kraton G 1652 hydrogenated triblock polymer, 6 g of tridecyl phosphite, 18 g of triphenyl phosphate, 9 g of polyethylene, 0.9 g of zinc sulfide, 0.9 g of zinc oxide, and 18 g of titanium dioxide. Formualtions and physical properties of the compositions are shown in the following table.

TABLE 2

| EXAMPLE | C-4* | II |
|---------|------|-----|
| Composition (parts by weight) | | |
| Poly(2,6-dimethyl-1,4-phenylene ether) resin | 50 | 50 |
| EC-C | 50 | 40 |
| Kraton G 1652 | — | 10 |
| Titanium dioxide | 3 | 3 |
| PROPERTIES | | |
| Tensile yield (psi) | 10,400 | 7,400 |
| Tensile elongation (%) | 50 | 31 |
| Tensile strength (psi) | 8,600 | 7,300 |
| Izod impact strength (ft.lbs./in. notch) | 3.5 | 11.4 |
| Heat distortion temperature at 264 psi (°F.) | 246 | 246 |

*Control

It can be seen from the above that compositions comprised of PPO, a small-particle EPDM-modified alkenyl aromatic resin, and a hydrogenated triblock copolymer show a dramatic increase in impact strength as compared to similar compositions not having the hydrogenated elastomeric block copolymer.

Obviously, other modifications and variations of the present invention are possible in the light of the above teachings. It is, therefore, to be understood that changes may be made in the particular embodiments described above which are within the full intended scope of the invention as defined in the appended claims.

We claim:
1. A thermoplastic molding composition comprising:
   (a) a polyphenylene ether resin;
   (b) an alkenyl aromatic resin that is modified with a rubbery interpolymer of a mixture of mono-olefins and a polyene by polymerizing alkenyl aromatic monomer in the presence of the rubbery interpolymer until 90–100% by weight of the alkenyl aromatic monomer has reacted, the rubbery interpolymer being comprised of particles having a median diameter less than about two microns; and
   (c) a selectively hydrogenated elastomeric block copolymer of the A-B-A type, wherein terminal blocks A are a polymerized vinyl aromatic hydrocarbon and center block B is a polymerized conjugated diene.

2. The molding composition of claim 1 wherein the alkenyl aromatic resin is modified with a rubbery interpolymer of ethylene, an alpha-olefin, and a polyene.

3. The molding composition of claim 2 wherein the alpha-olefin is propylene.

4. The molding composition of claim 1 wherein the rubbery interpolymer comprises 10–90 mole percent of ethylene, 10–90 mole percent of an alpha-olefin having 3–16 carbon atoms, and 0.1–12 mole percent of a polyene that is a non-conjugated cyclic or open-chain diene having 5–20 carbon atoms.

5. The molding composition of claim 4 wherein the alpha-olefin is propylene.

6. The molding composition of claim 4 wherein the polyphenylene ether resin is selected from the compounds of the formula

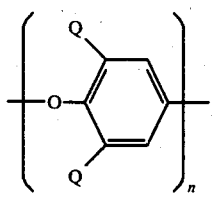

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and the halohydrocarbonoxy radicals having at least two carbon atoms between the halogen atom and the phenyl nucleus.

7. The molding composition of claim 1 wherein the alkenyl aromatic resin is prepared from a monomer selected from the group consisting of styrene, α-methylstyrene, bromostyrene, chlorostyrene, divinylbenzene, and vinyltoluene.

8. The molding composition of claim 1 wherein in the A-B-A block copolymer (c), the vinyl aromatic hydrocarbon of terminal blocks A is selected from the group consisting of styrene, α-methyl styrene, vinyltoluene, vinyl xylene, and vinyl naphthalene and the conjugated diene of center block B is selected from the group consisting of butadiene, 2-methyl-1,3-butadiene, 1,3-pentadiene, and 2,3-dimethylbutadiene.

9. The molding composition of claim 1 wherein the A-B-A block copolymer (c), each of terminal blocks A has an average molecular weight of from about 4,000 to about 115,000 and center block B has an average molecular weight of from about 20,000 to about 450,000.

10. The molding composition of claim 1 wherein the average unsaturation of center block B has been reduced to less than 20% of its original value.

11. The molding composition of claim 1 wherein the composition includes a reinforcing amount of an inorganic reinforcing filler.

12. The molding composition of claim 11 wherein the compositions includes from 10 to 50% by weight of fibrous glass filaments, based on the total weight of the composition.

13. The molding composition of claim 1 wherein the composition includes a flame-retardant amount of a flame-retardant additive.

14. The molding composition of claim 13 wherein the flame retardant is a halogenated organic compound, a halogenated organic compound in admixture with an antimony compound, elemental phosphorus, a phosphorus compound, compounds containing phosphorus-nitrogen bonds, or a mixture of two or more of the foregoing.

15. A thermoplastic molding composition comprising:
(a) from 80 to 65% by weight of a polyphenylene ether resin;
(b) from 20 to 80% by weight of an alkenyl aromatic resin that is modified with a rubbery interpolymer which comprises 10-90 mole percent of ethylene, 10-90 mole percent of an alpha-olefin having 3-10 carbon atoms, and 0.1-12 mole percent of a polyene that is a non-conjugated cyclic or open-chain diene having 5-10 carbon atoms, by polymerizing alkenyl aromatic monomer in the presence of the rubbery interpolymer until 90-100% by weight of the alkenyl aromatic monomer has reacted, the rubbery interpolymer being comprised of particles having a median diameter less than about two microns; and
(c) from about 1 to 20% by weight of a selectively hydrogenated elastomeric block copolymer of the A-B-A type, wherein terminal blocks A are polymerized vinyl aromatic hydrocarbons and center block B is a polymerized conjugated diene.

16. The molding composition of claim 15 wherein the polyphenylene ether resin is poly(2,6-dimethyl-phenylene) ether.

17. The molding composition of claim 15 wherein the alpha-olefin is propylene.

18. The molding composition of claim 15 wherein the alkenyl aromatic resin is styrene and said rubbery interpolymer is present between about 4% and about 25% by weight of styrene and rubbery interpolymer combined.

19. The molding composition of claim 15 wherein the rubbery interpolymer comprises 10-90 mole percent of ethylene, 10-90 mole percent of propylene, and 0.1-12 mole percent of 5-ethylidene-2-norbornene.

20. The molding composition of claim 15 wherein the rubbery interpolymer comprises 10-90 mole percent of ethylene, 10-90 mole percent of propylene, and 0.1-12 mole percent of 1,4-hexadiene.

21. The molding composition of claim 15 wherein the rubbery interpolymer comprises 10-90 mole percent of ethylene, 10-90 mole percent of propylene, and 0.1-12 mole percent of dicyclopentadiene.

22. A thermoplastic composition comprising:
(a) from 20 to 80% by weight of a polyphenylene ether resin;
(b) from 20 to 80% by weight of an alkenyl aromatic resin that is modified with a rubbery interpolymer which comprises 10-90 mole percent of ethylene, 10-90 mole percent of an alpha-olefin having 3-10 carbon atoms, and 0.1-12 mole percent of a polyene that is a non-conjugated cyclic or open-chain diene having 5-10 carbon atoms, by polymerizing alkenyl aromatic monomer in the presence of the rubbery interpolymer until 90-100% by weight of the alkenyl aromatic monomer has reacted, the rubbery interpolymer being comprised of particles having a median diameter less than about two microns;
(c) from about 1 to 20% by weight of a selectively hydrogenated elastomeric block copolymer of the A-B-A type, wherein terminal blocks A are polymerized vinyl aromatic hydrocarbons and center block B is a polymerized conjugated diene; and
(d) a reinforcing amount of an inorganic reinforcing filler.

23. The molding composition of claim 22 wherein the polyphenylene ether resin is poly(2,6-dimethyl-1,4-phenylene) ether.

24. The molding composition of claim 22 wherein the alpha-olefin is propylene.

25. The molding composition of claim 22 wherein the reinforcing filler comprises from 10 to 50% fibrous glass filaments, based on the total weight of the composition.

26. A thermoplastic molding composition comprising:
(a) from 20 to 80% by weight of a polyphenylene ether resin;
(b) from 20 to 80% by weight of an alkenyl aromatic resin that is modified with a rubbery interpolymer which comprises 10–90 mole percent of ethylene, 10–90 mole percent of an alpha-olefin having 3–10 carbon atoms, and 0.1–12 mole percent of a polyene that is a non-conjugated cyclic or open-chain diene having 5–10 carbon atoms, by polymerizing alkenyl aromatic monomer in the presence of the rubbery interpolymer until 90–100% by weight of the alkenyl aromatic monomer has reacted, the rubbery interpolymer being comprised of particles having a median diameter less than about two microns;
(c) from about 1 to 20% by weight of a selectively hydrogenated elastomeric block copolymer of the A-B-A type, wherein terminal blocks A are polymerized vinyl aromatic hydrocarbons and center block B is a polymerized conjugated diene; and
(d) a flame-retardant amount of a flame-retardant additive.

27. The molding composition of claim 26 wherein the alpha-olefin is propylene.

28. The molding composition of claim 26 wherein the flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

29. The molding composition of claim 26 wherein the flame-retardant additive comprises a mixture of an organic bromine-containing compound with antimony oxide.

30. The molding composition of claim 26 wherein the flame-retardant additive is triphenylphosphate.

31. The molding composition of claim 26 wherein the flame-retardant additive is comprised of a mixture of triaryl phosphates wherein one or more aryl groups are substituted by one or more isopropyl groups.

* * * * *